(12) United States Patent
Bambacigno (10) Patent No.: US 6,848,472 B2
(45) Date of Patent: Feb. 1, 2005

(54) LIQUID STABILIZING DEFLECTOR BAFFLE

(75) Inventor: John A. Bambacigno, 507 N. Idaho Ave., Grangeville, ID (US) 83530

(73) Assignee: John A. Bambacigno, Grangeville, ID (US)

(*) Notice: Subject to any disclaimer, the term of this patent is extended or adjusted under 35 U.S.C. 154(b) by 75 days.

(21) Appl. No.: 10/340,533

(22) Filed: Jan. 10, 2003

(65) Prior Publication Data

US 2004/0134916 A1 Jul. 15, 2004

(51) Int. Cl.⁷ .................................................. B60P 3/00
(52) U.S. Cl. ........................ 137/574; 137/575; 220/563
(58) Field of Search ........................... 220/563; 137/57, 137/575

(56) References Cited

U.S. PATENT DOCUMENTS

| | | |
|---|---|---|
| 2,379,126 A | 6/1945 | Welden |
| 2,860,809 A | 11/1958 | Perry |
| 3,288,186 A | 11/1966 | Headrick |
| 3,349,953 A | 10/1967 | Conaway et al. |
| 3,804,292 A | 4/1974 | Chiti |
| 3,979,005 A | 9/1976 | Robinson et al. |
| 4,013,190 A | 3/1977 | Wiggins et al. |
| 4,550,848 A | 11/1985 | Sucato |
| 4,796,773 A | 1/1989 | Gerhard |
| 4,858,778 A | 8/1989 | Patrick |
| 4,927,045 A | 5/1990 | Lichka |
| 5,890,618 A | 4/1999 | Spickelmire |
| 5,960,981 A | 10/1999 | Dodson et al. |
| 6,062,417 A | 5/2000 | Evans |
| 6,308,856 B1 | 10/2001 | Spickelmire |
| 6,375,030 B1 | 4/2002 | Spickelmire |
| 6,431,388 B1 | 8/2002 | Spickelmire et al. |
| D469,846 S | 2/2003 | Spickelmire |
| 6,547,090 B2 | 4/2003 | Spickelmire et al. |

Primary Examiner—Joseph Man-Fu Moy
(74) Attorney, Agent, or Firm—Wells St. John P.S.

(57) ABSTRACT

A liquid stabilizing deflector baffle system, including a method and an apparatus, including a plurality of deflectors interconnected together to provide a baffling effect on liquid in which it is installed.

22 Claims, 6 Drawing Sheets

LIQUID STABILIZING DEFLECTOR BAFFLE

TECHNICAL FIELD

The present invention relates to the stabilization and deflection of fluids utilizing baffles.

BACKGROUND OF THE INVENTION

There are numerous applications in which dampening, control or attenuation of fluid flow is desired. For instance it may be desirable to deflect or baffle the free flow of fluids in a liquid tanker mounted on a vehicle to prevent rollover, or to dampen the free flow of water along the bank of a river to reduce erosion. The free flow of fluids in a tanker vehicle can be dangerous to the balance and control of the vehicle. Tanker trucks for instance carrying less than full tanks of fluid tend to turn over when cornering due to the centrifugal movement of the fluid to the outside portion of the fluid tank during the turn. The shifting of weight to the outside of the turn radius upsets the balance of the vehicle chassis and causes a lessening of vehicle control, or complete loss of control and the possible rollover of the vehicle.

The free flow of water in a river or stream also is problematic as it may cause erosion and deterioration of structural sea walls and break waters.

It is therefore an object of this invention to provide an improved liquid stabilizing deflector baffle.

BRIEF DESCRIPTION OF THE DRAWINGS

Preferred embodiments of the invention are described below with reference to the following accompanying drawings:

FIG. 3 is a diagrammatic operational view illustrating deflector baffles in a tank, with one deflector baffle being inserted into the tank opening;

DETAILED DESCRIPTION OF THE PREFERRED EMBODIMENT(S)

Many of the fastening, connection, manufacturing and other means and components utilized in this invention are widely known and used in the field of the invention described, and their exact nature or type is not necessary for an understanding and use of the invention by a person skilled in the art or science; therefore, they will not be discussed in significant detail. Furthermore, the various components shown or described herein for any specific application of this invention can be varied or altered as anticipated by this invention and the practice of a specific application or embodiment of any element may already be widely known or used in the art or by persons skilled in the art or science; therefore, each will not be discussed in significant detail.

The terms "a", "an", and "the" as used in the claims herein are used in conformance with long-standing claim drafting practice and not in a limiting way. Unless specifically set forth herein, the terms "a", "an", and "the" are not limited to one of such elements, but instead mean "at least one".

Figure 1:
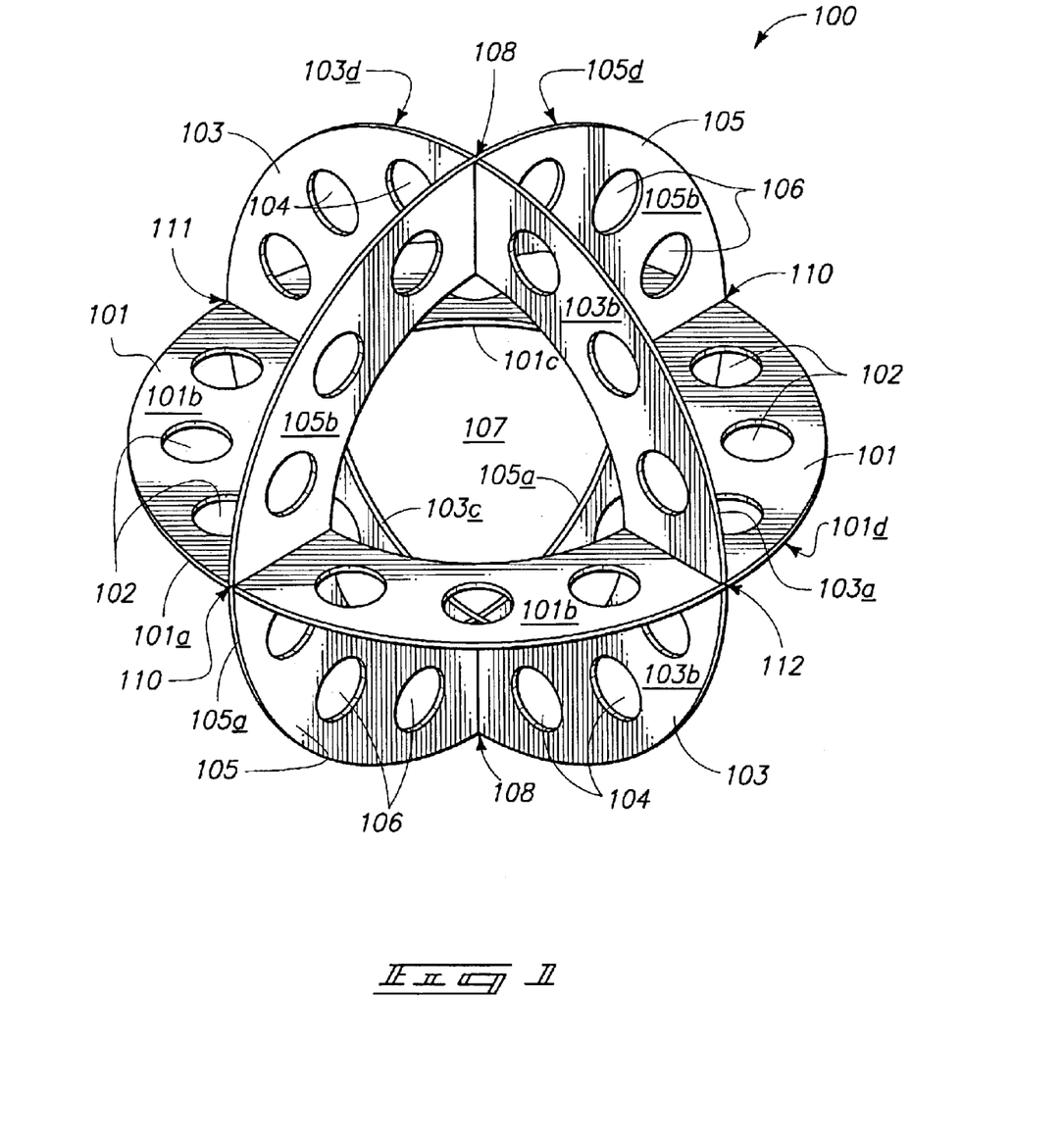
FIG. 1 is a perspective view of one embodiment of a liquid stabilizing deflector baffle contemplated by this invention.

FIG. 1 is a perspective view of one embodiment of a liquid stabilizing deflector baffle which may be utilized as this invention, illustrating three interlocking deflectors or baffle means, namely deflectors 101, 105 and 103. The three deflectors uniquely fit together in the preferred embodiment in an interlocking or interlacing manner as shown. In an aspect of the invention, the baffle may be assembled without fasteners, by merely bending the deflectors relative to one another to align the respective slots with other slots or with the body of one of the other deflectors. In some embodiments of this invention, it is preferable to assemble and use the baffles without any attaching fasteners. However, it will be appreciated by those of ordinary skill in the art that the invention is not limited to stabilizing deflector baffles in which fastening ways are not utilized other than interlocking.

FIG. 1 illustrates liquid stabilizing deflector baffle 100 with first deflector 101, first side 101b of first deflector 101, outer edge 101d (or radially outward edge), inner edge 101c (or radially inward edge), and a bottom surface (not shown in FIG. 1). First side 101b is also illustrated and a plurality of first baffle apertures 102 is illustrated as circular and relatively uniform in the embodiment shown. It will also be appreciated by those of ordinary skill in the art that the apertures may be any one of a number of different shapes and configurations, both uniform and non-uniform, on first deflector 101.

Second deflector 103 is also shown with second deflector outer edge 103d, second deflector inner edge 103c, second deflector first surface 103b and second surface 103d.

It will be appreciated by one of ordinary skill in the art that the invention may be practiced with only two deflectors instead of the three deflectors shown, within the contemplation of this invention. In this case there may be some changes to the relative size of the sides of the deflectors, side surfaces and/or flow apertures.

Third deflector 105 includes third deflector apertures 106, first surface 105b, outer edge 105a, inner edge 105c and second surface 105d.

First deflector 101 intersects with second deflector 103 at first intersection areas 110 and second intersection areas 111. It will be noted from this and other drawings that first intersection areas 110 between first deflector 101 and second deflector 103 are accomplished by bending a deflector and sliding first deflector 101b within slots within second deflector 103, the slots which are shown more fully in other figures. The slots are one of multiple shapes of interconnection apertures or slots which may be utilized within the contemplation of this invention;

Second deflector 103 intersects with third deflector 105 at intersection points 108 and 111. First deflector 101 intersects with third deflector 105 at intersection points 110 and 112. Internal cavity 107 to deflector baffle 100 is also shown. It will be appreciated by those of ordinary skill in the art that the deflectors need not be the same size, diameter or proportions, but instead there may be three dissimilar sizes and shapes interconnected together, all within the contemplation of this invention.

In the embodiment of the invention shown in FIG. 1, the three deflectors each have an internal cavity, and the internal cavities intersect one another, and the same would be true in the two deflector embodiment of the invention (which could be the same configuration, only with just two deflectors instead of three). In the embodiment of the invention shown in FIG. 1, the three deflectors are each concentric with one another, and the same would be true in the two deflector embodiment of the invention (which could be the same configuration, only with just two deflectors instead of three)

Figure 2:
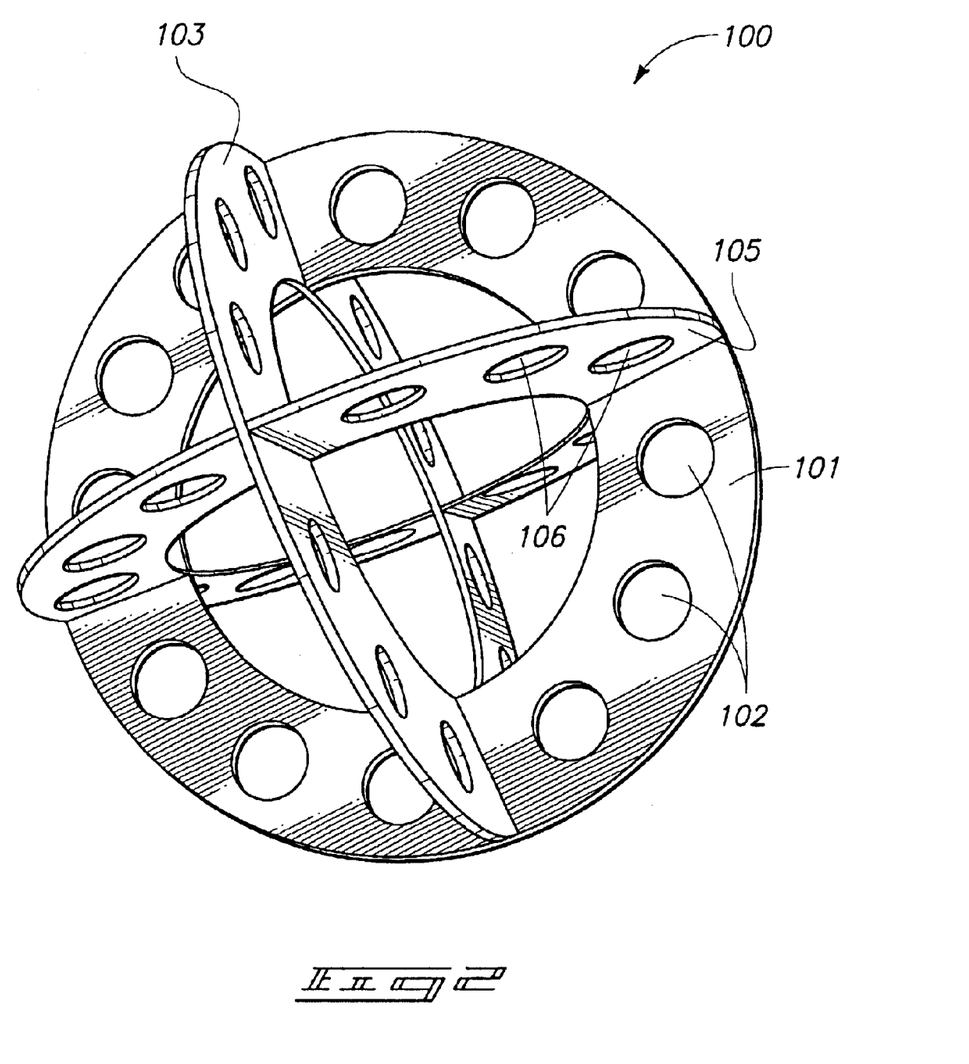
FIG. 2 is a bottom perspective view of the embodiment of the liquid stabilizing deflector baffle illustrated in FIG. 1.

FIG. 2 shows a bottom perspective view of the liquid stabilizing deflector baffle 100 illustrated in FIG. 1, showing first deflector 101 with a plurality of first deflector apertures 102, second deflector 103 and third deflector 105 with third deflector apertures 106.

FIG. 3 illustrates schematically a plurality of liquid stabilizing deflector baffles as contemplated in embodiments of this invention, in a liquid storage tank, with one deflector baffle 157 being inserted into vessel entry 105. FIG. 3 illustrates first deflector baffle 153, second deflector baffle 154, third deflector baffle 155, fourth deflector baffle 156 and fifth deflector baffle 157. The liquid container vessel 149 includes outer wall 150 and fluid 151 as shown therein with fluid surface 152. The entry walls 160 are shown to just barely permit the insertion of fifth deflection baffle 157 into the inner cavity of the tank.

Figure 4:
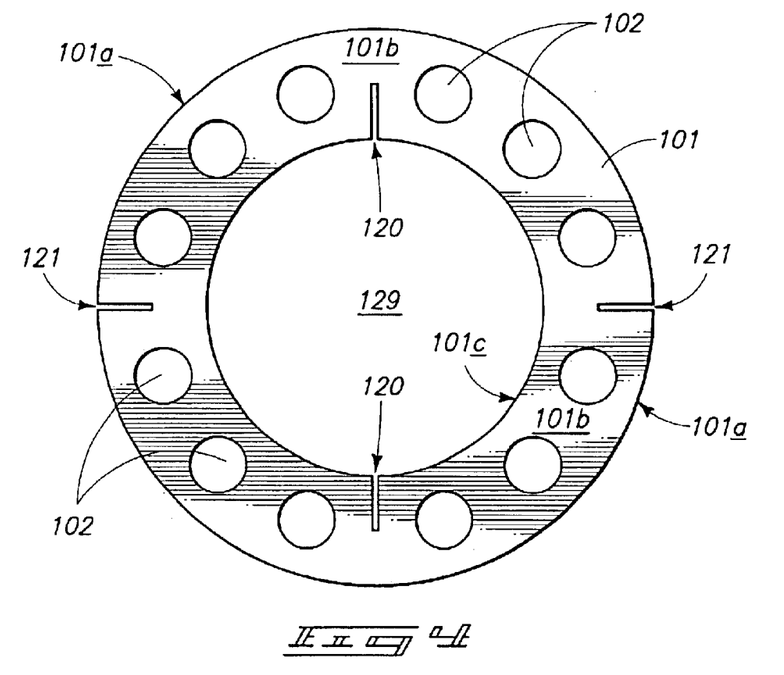
FIG. 4 is a top view of the first deflector 101 illustrated in FIG. 1.

FIG. 4 is a face view of first deflector 101, showing first deflector apertures 102, first slots 120 and second slots 121, first surface 101b, inner edge 101c and outer edge 101a. First deflector is shown to have two inner slots 120 and two outer slots 121 for interaction, interlacing and interlocking with second baffle 103 (shown in other figures) and third baffle 105 (shown in other figures). Internal cavity 129 is also shown.

Figure 5:
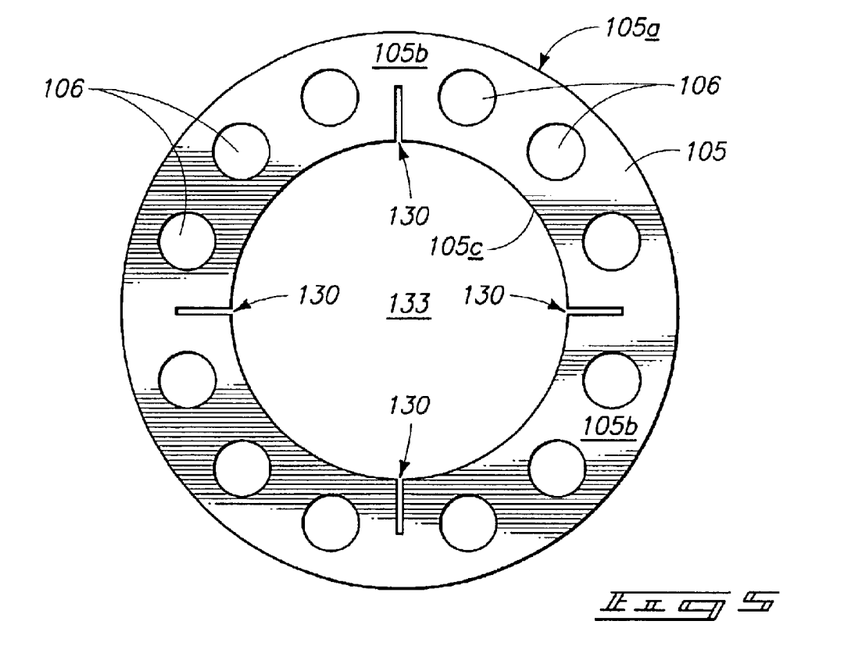
FIG. 5 is a front view of third deflector 105 illustrated in FIG. 1.

FIG. 5 is a face elevation view of third deflector 105, third deflector apertures 106, outer edge 105a, first surface 105b, inner edge 105c, internal cavity 133 and internal slots 130. It will be noted that the deflectors such as deflector 105 include a first surface 105b and a second surface on the other side of the deflector, with an inner edge 105c and an outer edge 105a. In this embodiment, the distance from the inner edge 105c to the outer edge 105a is much greater (by several times) than the width of the edges or the distance from the first side 105b of the deflector 105 to the second side of the deflector 105. The deflector bodies are therefore oriented longitudinally in the radially outward direction in the embodiments of the invention illustrated.

Figure 6:
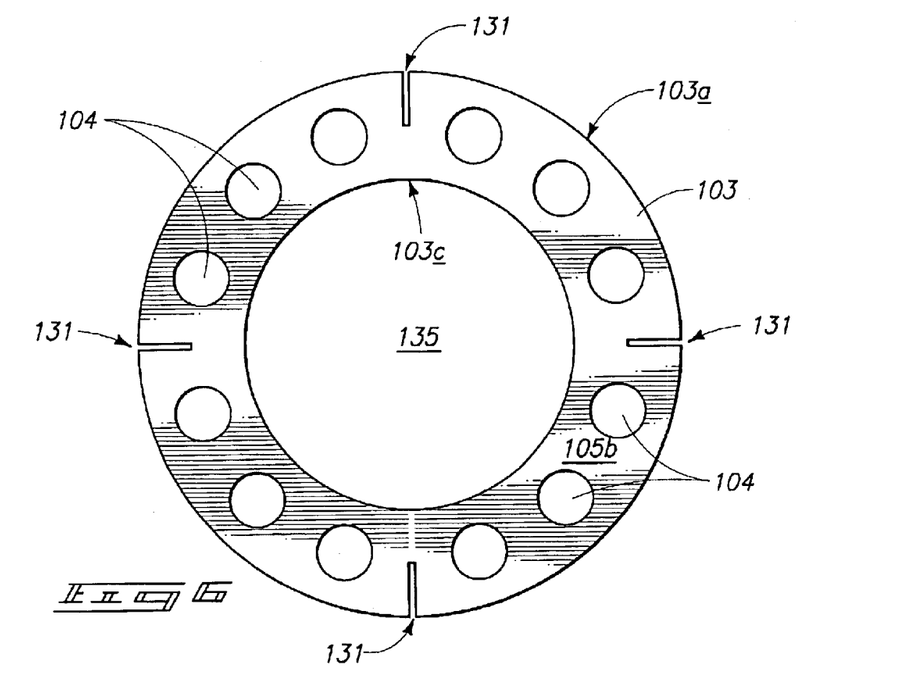
FIG. 6 is a front view of second deflector 103 illustrated in FIG. 1.

FIG. 6 is a face view of second deflector baffle 103, showing outer edge 103a, inner edge 103c, inner cavity 135, second deflector baffle apertures 104, first surface 103b and interlocking slots 131, which it will be noted are all external slots, meaning they face and open to the outer edge 103a of deflector baffle 103.

It will be appreciated by those of ordinary skill in the art that second deflector 103 may be bent to fit within third deflector 105 and first deflector 101, to interlock the respective baffles.

In the embodiments illustrated, general overall configuration and dimensions may be similar or at least substantially proportional, or they may be different, all within the contemplation of this invention.

While it has been found that polyethylene is a desirable material for the deflector baffles, any one of a number of different materials may be utilized within the contemplation of embodiments of this invention, with no one in particular being required to practice the invention. It is preferred that whatever material used is relatively impervious to most liquids and preferably would include resiliency or spring-like properties that would be more desirable for the desired energy absorbing effect. Even though polyethylene may be preferred, polyvinylchloride, nylon, stainless steel or other resilient sheet or deflector materials may also be used.

In order to give some dimensions of a possible embodiment as illustrated in FIGS. 1 & 2 for example, the approximate radius to the inner edge of the deflectors is six inches, the radius to the outer edge is about ten inches, the thickness is about one-eighth of an inch to one-quarter of an inch, and the deflector flow aperture diameters may be about two inches. It will be noted there are no particular dimension, relative dimension or proportion is required to practice this invention. It will also be noted that the various deflectors are sufficiently flexible to allow the interlocking or interlacing or interconnection of the first, second and third deflector baffles for easier assembly and storage of components. The interlocking configuration is advantageous so that no fastening hardware need be supplied in the embodiments shown, although this invention is not limited to one in-which fasteners are not used. It has been found that a deflector baffle configuration with a first surface and a second surface as shown is more effective than the loop system shown in prior art, such as that shown in U.S. Pat. No. 6,431,388, issued to Spickelmire for "Liquid Stabilizing Baffle".

Figure 7:
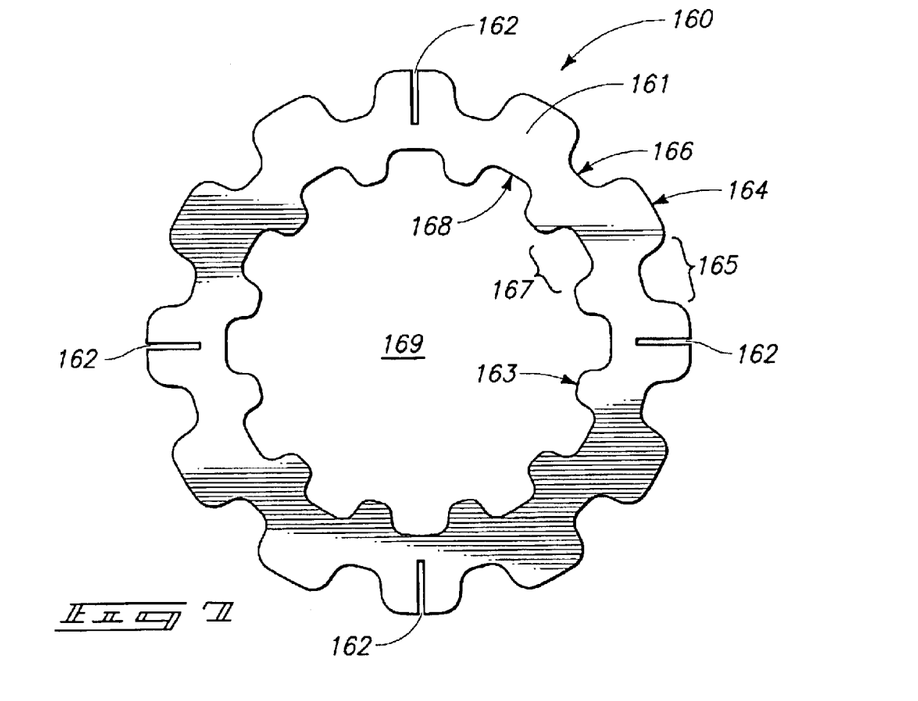
FIG. 7 is an alternative embodiment or configuration second of a second deflector which may be used in this invention.

FIG. 7 is an alternative embodiment of a second deflector 160 due to the slot configuration, but could also be an alternative embodiment of the first or second deflectors if the slot configuration is changed. FIG. 7 illustrates deflector 160, deflector body 161, inner cavity 189, inner edge 163, outer edge 164, and slots 162. Although flow apertures through the deflectors are not required to practice this invention, the embodiment in FIG. 7 illustrates an alternative configuration, with a plurality of outer edge indents 165 with indent outer edge 165, and a plurality of inner edge indents 167 with inner edge 168 therein.

It will be appreciated by those of ordinary skill in the art that the indents and the apertures in the deflectors may by any shape (triangular, square, etc.) or the deflectors may be without apertures. It will also be appreciated by those of ordinary skill in the art that while the configurations for the deflector baffles shown are generally spherical, they may be any one of a number of different configurations within the contemplation of this invention, such as square, rectangular, pyramid shaped, and the like.

It is another feature, although not required in all embodiments of this invention, to provide a deflector/baffle which does not require fasteners to assemble, but instead may be interconnected with any fasteners due to the unique configuration. For instance fastener members such as those shown in U.S. Pat. No. 6,431,388, issued to Spickelmire for "Liquid Stabilizing Baffle" are not required to practice this invention.

One method to assemble the embodiment of the invention shown in the figures is to bend first deflector 101 such that slots 121 interlaced or interconnected with slots 130 in the third deflector 105, then allowing first deflector 101 to straighten out, thereby aligning it within slots 130 in third deflector 105. Then second deflector 103 may be bent to allow slots 131 to interlace with the other slots 130 within third deflector 105. Straightening second deflector 103, or allowing it to straighten and thereby aligning the slots, results in the baffle configuration illustrated in FIG. 1 for example.

Figure 8B:
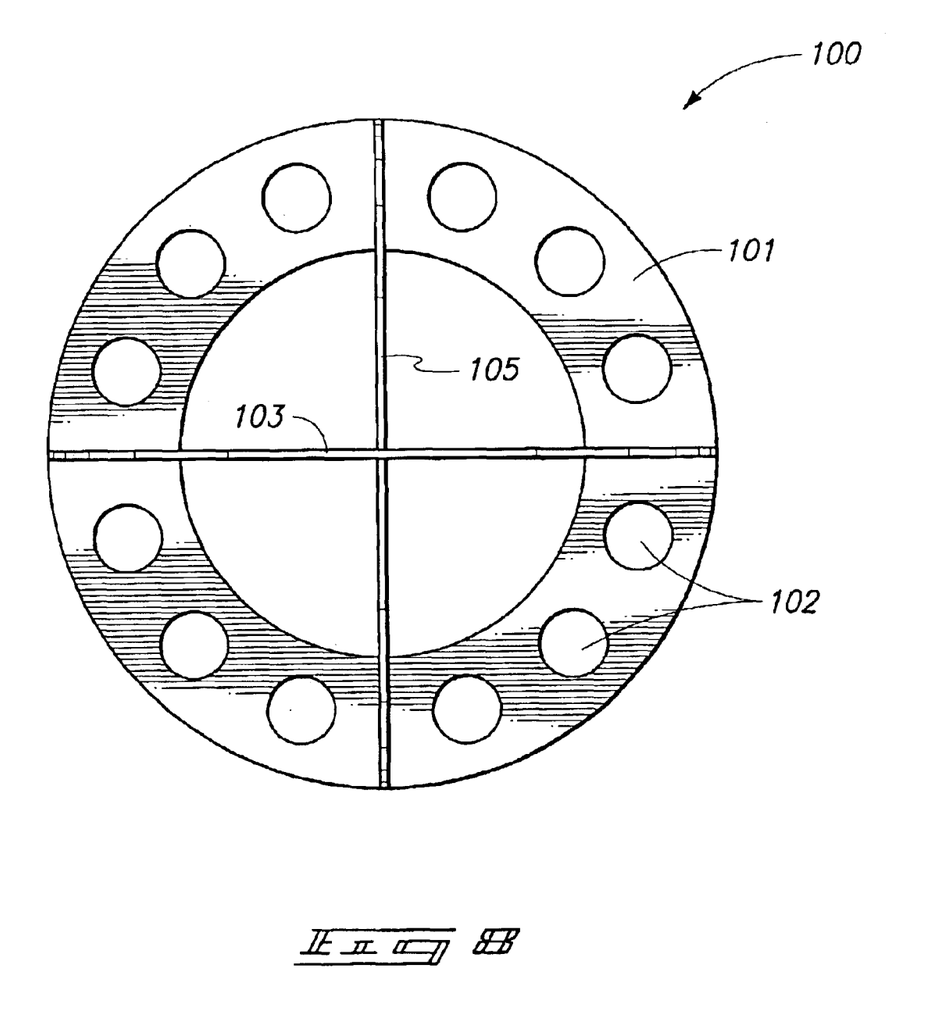
FIG. 8 is a front elevation view of the embodiment of the invention illustrated in FIG. 1.
Figure 11:
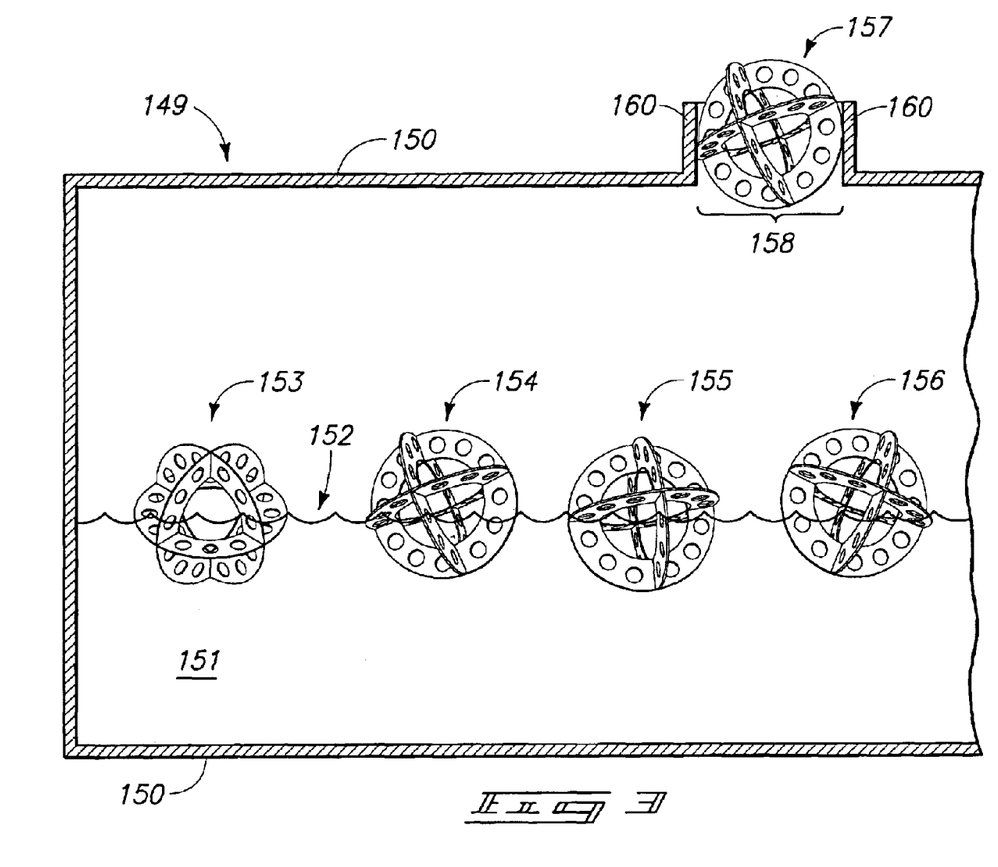

FIG. 8 is a front elevation view of the embodiment of the liquid stabilizing deflector baffle 100 illustrated in FIG. 1, showing first deflector 101, second deflector 103 and third deflector 105, with flow apertures 102 in first deflector. It will be noted that the view shown in FIG. 8 is also a rear elevation view, a bottom view, and a side elevation view from each side as the embodiment of the invention is symmetrical.

As will be appreciated by those of reasonable skill in the art, there are numerous embodiments to this invention, and variations of elements and components which may be used, all within the scope of this invention.

One embodiment of this invention, for example, a liquid stabilizing deflector baffle comprising: a first deflector with a first side, a second side, a radially inward edge defining an internal cavity, and a radially outward edge; and a second deflector with a first side, a second side, an inner edge defining an internal cavity, and an outer edge, the second deflector being attached to the first deflector; and wherein the first deflector and the second deflector are longitudinally oriented in a radially outward direction.

In a possible further aspect of this embodiment, a liquid stabilizing deflector baffle as recited in the preceding paragraph above may be provided, only further wherein the second deflector is attached to the first deflector with attachment apertures which are integral with the second deflector.

In another embodiment of this invention, a liquid stabilizing deflector baffle is provided which comprises: a first deflector with a first side, a second side, a radially inward edge defining an internal cavity, and a radially outward edge; a second deflector with a first side, a second side, an inner edge defining an internal cavity, and an outer edge, the second deflector being attached to the first deflector; and a third deflector with a first side, a second side, an inner edge defining an internal cavity, and an outer edge, the third deflector being attached to the first deflector and to the second deflector; such that at least one of the first deflector, the second deflector and the third deflector, is longitudinally oriented in a radially outward direction.

In possible further aspects of this embodiment, a liquid stabilizing deflector baffle as recited in the preceding paragraph above may be provided, only further: wherein the second deflector is attached to the first deflector with attachment apertures which are integral with the second deflector; wherein the third deflector is attached to the first deflector and to the second deflector with attachment apertures which are integral with the third deflector; comprising a plurality of fluid flow apertures in at least one of the first deflector, the second deflector and the third deflector; comprising a plurality of fluid flow apertures in each of the first deflector, the second deflector and the third deflector; wherein each of the first deflector, the second deflector and the third deflector, are longitudinally oriented in a radially outward direction; and/or wherein each of the first deflector, the second deflector and the third deflector, are longitudinally oriented in a radially outward direction.

In yet another embodiment of this invention, a liquid stabilizing deflector baffle may be provided which comprises: a first deflector with a first side, a second side, an inner edge defining an internal cavity, an outer edge; a second deflector with a first side, a second side, an inner edge defining an internal cavity, an outer edge, and a plurality of second deflector interconnection apertures; and a third deflector with a first side, a second side, an inner edge defining an internal cavity, an outer edge, and a plurality of third deflector interconnection apertures, the third deflector being attached to the first deflector to the second deflector by interconnection of at least one of the third deflector interconnection apertures with the second deflector and the third deflector.

In possible further aspects of this embodiment, a liquid stabilizing deflector baffle as recited in the preceding paragraph above may be provided, only further: wherein the first deflector includes at least one first deflector interconnection aperture which interconnects with at least one of the plurality of third deflector interconnection apertures; wherein the second deflector includes at least one second deflector interconnection aperture which interconnects with at least one of the plurality of third deflector interconnection apertures; wherein the first deflector includes a plurality of first deflector interconnection apertures which interconnect with the plurality of third deflector interconnection apertures; and further wherein the second deflector includes a plurality of second deflector interconnection apertures which interconnect with the plurality of third deflector interconnection apertures and also wherein at least one of the plurality of first deflector interconnection apertures interconnects with at least one of the plurality of the second deflector interconnection apertures; comprising a plurality of fluid flow apertures in at least one of the first deflector, the second deflector and the third deflector.

In another embodiment of the invention, a liquid stabilizing deflector baffle may be provided which comprises: a first deflector with a first side, a second side, an inner edge defining an internal cavity, and an outer edge; a second deflector with a first side, a second side, an inner edge defining an internal cavity, and an outer edge, the second deflector being attached to the first deflector with fastening means integral with the second deflector; and a third deflector with a first side, a second side, an inner edge defining an internal cavity, and an outer edge, the third deflector being attached to the first deflector and the second deflector with fastening means integral with the third deflector. In a further aspect of this embodiment, a liquid stabilizing deflector baffle may be provided further wherein the fastening means is comprised of at least one third deflector interconnection slot attached to each of the first deflector and the second deflector.

In another embodiment of this invention, a liquid stabilizing deflector baffle comprising: a first baffle means with a first side, a second side, an inner edge defining an internal cavity, an outer edge, and a plurality of first baffle interconnection apertures, longitudinally oriented in the radially outward direction; a second baffle means with a first side, a second side, an inner edge defining an internal cavity, an outer edge, longitudinally oriented in the radially outward direction; and a third baffle means with a first side, a second side, an inner edge defining an internal cavity, an outer edge, longitudinally oriented in the radially outward direction, wherein the third baffle means is attached to the first baffle means and the second baffle means. In a further aspect of this embodiment, a liquid stabilizing deflector baffle may be provided further comprising a plurality of fluid flow apertures in at least one of the first baffle, the second baffle and the third baffle.

In another embodiment of the invention, a process or method embodiment, a method of assembling a liquid stabilizing deflector baffle may be provided which comprises the following: providing a first deflector with a first side, a second side, an inner edge defining an internal cavity, an outer edge, and a plurality of first deflector interconnection apertures; providing a second deflector with a first side, a second side, an inner edge defining an internal cavity, an outer edge, and a plurality of second deflector interconnection apertures; bending the second deflector into the internal cavity of the first deflector and aligning at least one of the plurality of second deflector interconnection apertures with at least one of the plurality of firs interconnection apertures; and allowing the second deflector to spring back to its original shape and thereby interconnecting the deflectors by interconnecting at least one of the plurality of second deflector interconnection apertures with at least one of the plurality of first interconnection apertures.

In a further method embodiment from the preceding paragraph, a method of assembling a liquid stabilizing deflector baffle may be provided further: providing a third deflector with a first side, a second side, an inner edge defining an internal cavity, an outer edge, and a plurality of third deflector interconnection apertures; and bending the third deflector into the internal cavity of the first deflector and the second deflector, aligning at least one of the plurality of third deflector interconnection apertures with at least one of the plurality of first interconnection apertures; and allowing the third deflector to spring back to its original shape and thereby interconnecting the third deflector with the first deflector by interconnecting the plurality of third deflector interconnection apertures with the plurality of first interconnection apertures.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A liquid stabilizing deflector baffle comprising:
   a first deflector with a first side, a second side, a radially inward edge defining an internal cavity, and a radially outward edge; and
   a second deflector with a first side, a second side, an inner edge defining an internal cavity, and an outer edge, the second deflector being attached to the first deflector; and
   wherein the first deflector and the second deflector are longitudinally oriented in a radially outward direction.

2. A liquid stabilizing deflector baffle as recited in claim 1, and further wherein the second deflector is attached to the first deflector with attachment apertures which are integral with the second deflector.

3. A liquid stabilizing deflector baffle comprising:
   a first deflector with a first side, a second side, a radially inward edge defining an internal cavity, and a radially outward edge;
   a second deflector with a first side, a second side, an inner edge defining an internal cavity, and an outer edge, the second deflector being attached to the first deflector; and
   a third deflector with a first side, a second side, an inner edge defining an internal cavity, and an outer edge, the third deflector being attached to the first deflector and to the second deflector;
   such that at least one of the first deflector, the second deflector and the third deflector, is longitudinally oriented in a radially outward direction.

4. A liquid stabilizing deflector baffle as recited in claim 3, and further wherein the second deflector is attached to the first deflector with attachment apertures which are integral with the second deflector.

5. A liquid stabilizing deflector baffle as recited in claim 4, and further wherein the third deflector is attached to the first deflector and to the second deflector with attachment apertures which are integral with the third deflector.

6. A liquid stabilizing deflector baffle as recited in claim 3, and further comprising a plurality of fluid flow apertures in at least one of the first deflector, the second deflector and the third deflector.

7. A liquid stabilizing deflector baffle as recited in claim 3, and further comprising a plurality of fluid flow apertures in all three of the first deflector, the second deflector and the third deflector.

8. A liquid stabilizing deflector baffle as recited in claim 3, and further comprising a plurality of fluid flow apertures in each of the first deflector, the second deflector and the third deflector.

9. A liquid stabilizing deflector baffle as recited in claim 3, and further wherein each of the first deflector, the second deflector and the third deflector, are longitudinally oriented in a radially outward direction.

10. A liquid stabilizing deflector baffle as recited in claim 3, and further wherein each of the first deflector, the second deflector and the third deflector, are longitudinally oriented in a radially outward direction.

11. A liquid stabilizing deflector baffle comprising:
    a first deflector with a first side, a second side, an inner edge defining an internal cavity, an outer edge;
    a second deflector with a first side, a second side, an inner edge defining an internal cavity, an outer edge, and a plurality of second deflector interconnection apertures; and
    a third deflector with a first side, a second side, an inner edge defining an internal cavity, an outer edge, and a plurality of third deflector interconnection apertures, the third deflector being attached to the first deflector to the second deflector by interconnection of at least one of the third deflector interconnection apertures with the second deflector and the third deflector.

12. A liquid stabilizing deflector baffle as recited in claim 11, and further wherein the first deflector includes at least one first deflector interconnection aperture which interconnects with at least one of the plurality of third deflector interconnection apertures.

13. A liquid stabilizing deflector baffle as recited in claim 12, and further wherein the second deflector includes at least one second deflector interconnection aperture which interconnects with at least one of the plurality of third deflector interconnection apertures.

14. A liquid stabilizing deflector baffle as recited in claim 11, and further wherein the first deflector includes a plurality of first deflector interconnection apertures which interconnect with the plurality of third deflector interconnection apertures; and further wherein the second deflector includes a plurality of second deflector interconnection apertures which interconnect with the plurality of third deflector interconnection apertures.

15. A liquid stabilizing deflector baffle as recited in claim 14, and further wherein at least one of the plurality of first deflector interconnection apertures interconnects with at least one of the plurality of the second deflector interconnection apertures.

16. A liquid stabilizing deflector baffle as recited in claim 11, and further comprising a plurality of fluid flow apertures in at least one of the first deflector, the second deflector and the third deflector.

17. A liquid stabilizing deflector baffle comprising:
a first deflector with a first side, a second side, an inner edge defining an internal cavity, and an outer edge;
a second deflector with a first side, a second side, an inner edge defining an internal cavity, and an outer edge, the second deflector being attached to the first deflector with fastening means integral with the second deflector; and
a third deflector with a first side, a second side, an inner edge defining an internal cavity, and an outer edge, the third deflector being attached to the first deflector and the second deflector with fastening means integral with the third deflector.

18. A liquid stabilizing deflector baffle as recited in claim 17, and further wherein the fastening means is comprised of at least one third deflector interconnection slot attached to each of the first deflector and the second deflector.

19. A liquid stabilizing deflector baffle comprising:
a first baffle means with a first side, a second side, an inner edge defining an internal cavity, an outer edge, and a plurality of first baffle interconnection apertures, longitudinally oriented in the radially outward direction;
a second baffle means with a first side, a second side, an inner edge defining an internal cavity, an outer edge, longitudinally oriented in the radially outward direction; and
a third baffle means with a first side, a second side, an inner edge defining an internal cavity, an outer edge, longitudinally oriented in the radially outward direction, wherein the third baffle means is attached to the first baffle means and the second baffle means.

20. A liquid stabilizing deflector baffle as recited in claim 19, and further comprising a plurality of fluid flow apertures in at least one of the first baffle, the second baffle and the third baffle.

21. A method of assembling a liquid stabilizing deflector baffle comprising the following:

providing a first deflector with a first side, a second side, an inner edge defining an internal cavity, an outer edge, and a plurality of first deflector interconnection apertures;
providing a second deflector with a first side, a second side, an inner edge defining an internal cavity, an outer edge, and a plurality of second deflector interconnection apertures;
bending the second deflector into the internal cavity of the first deflector and aligning at least one of the plurality of second deflector interconnection apertures with at least one of the plurality of firs interconnection apertures; and
allowing the second deflector to spring back to its original shape and thereby interconnecting the deflectors by interconnecting at least one of the plurality of second deflector interconnection apertures with at least one of the plurality of first interconnection apertures.

22. A method of assembling a liquid stabilizing deflector baffle as recited in claim 21, and further:
providing a third deflector with a first side, a second side, an inner edge defining an internal cavity, an outer edge, and a plurality of third deflector interconnection apertures; and
bending the third deflector into the internal cavity of the first deflector and the second deflector, aligning at least one of the plurality of third deflector interconnection apertures with at least one of the plurality of first interconnection apertures; and
allowing the third deflector to spring back to its original shape and thereby interconnecting the third deflector with the first deflector by interconnecting the plurality of third deflector interconnection apertures with the plurality of first interconnection apertures.

* * * * *

UNITED STATES PATENT AND TRADEMARK OFFICE
CERTIFICATE OF CORRECTION

PATENT NO.    : 6,848,472 B2
DATED         : February 1, 2005
INVENTOR(S)   : John A. Bambacigno It is certified that error appears in the above-identified patent and that said Letters Patent is hereby corrected as shown below:

<u>Column 4,</u>
Line 41, replace "that the indents and the apertures in the deflectors may by" with
-- that the indents and the apertures in the deflectors may be --.

<u>Column 7,</u>
Line 5, replace "at least one of the plurality of firs interconnection apertures;" with
-- at least one of the plurality of first interconnection apertures; --.

<u>Column 10,</u>
Line 12, replace "least one of the plurality of firs interconnection aper-" with
-- least one of the plurality of first interconnection aper- --.

Signed and Sealed this

Twenty-third Day of August, 2005

JON W. DUDAS
*Director of the United States Patent and Trademark Office*